United States Patent Office 3,281,421
Patented Oct. 25, 1966

3,281,421
PHARMACOLOGICALLY ACTIVE 3,8-DIAZA-BICYCLO-[3,2,1]-OCTANES
Giorgio Cignarella, Milan, Italy, and Emilio Testa, Tessin, Switzerland, assignors to Lepetit S.p.A., Milan, Italy
No Drawing. Filed June 18, 1962, Ser. No. 202,994
Claims priority, application Great Britain, June 26, 1961, 23,076/61
5 Claims. (Cl. 260—268)

The present invention relates to new pharmacologically active compounds. More particularly this invention is concerned with new 3,8-diazabicyclo-[3,2,1]-octanes of the formula:

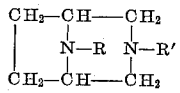

wherein one of the symbols R and R' represents acyl and the other represents a radical selected from the group consisting of hydrogen and alkyl, aryl, aralkyl, optionally ring-substituted aralkenyl and cyclo-alkyl-lower-alkyl, and the corresponding salts with organic or mineral acids and with non-toxic alkyl halogenides.

Such compounds prove to be active as diuretics and on the central and vegetative nervous system. For instance 3α - methyl - tropoyl - 8 - methyl-3,8-diazabicyclo-[3,2,1]-octane has a marked anticholinergic activity, comparable with that of atropine; it causes a 67 percent inhibition of the contractions caused by acetylcholine on the isolated rat intestine at a concentration of 0.03–0.05γ/ml., said activity of the racemic form of the compound in question is primarily due to the levo form, which produces the same effect at a concentration of 0.01–0.03 γ/ml.

3-methyl-8-propionyl - 3,8-diazabicyclo-[3,2,1]-octane was found to be highly active as an analgesic. In experiments carried out on rats according to Randall and Selitto's method, when administered by intraperitoneal route it caused a percentage increase of the pain threshold to the pressure stimulus of 42 at the dose of 7.5 mg./kg. and of 139 at the dose of 10 mg./kg.

The same activity is observed after oral administration. The intraperitoneal administration of 10 mg./kg. to mice causes a variation of the reaction time to the pain stimulus due to a hot plate according to Eddy's method, as determined 20 minutes after giving the drug of +2.5 seconds, while a variation of +4.36 seconds is observed with 25 mg./kg. Orally the variation is +2.30 seconds at 10 mg./kg. and +4.89 at 25 mg./kg.

The compound 3-cinnamyl-8-propionyl-3,8-diazabicyclo-[3,2,1]-octane is also exceptionally active as an analgesic. The percentage increase in pain threshold in rats is intraperitoneally 46.5, 75.8 and 143 with doses of 0.1, 0.2 and 0.4 mg./kg. respectively, and orally is 23 and 63.5 with 0.2 and 0.4 mg./kg. respectively.

The process for preparing the compounds of the invention consists in the acylation by conventional procedures of 3,8-diazabicyclo-[3,2,1]-octane of the formula:

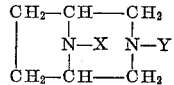

wherein one of the symbols X and Y is hydrogen and the other represents a hydrogen, an alkyl, aryl, aralkyl, optionally ring-substituted aralkenyl and cycloalkyl-lower-alkyl radical.

The starting compounds are prepared by the process substantially described in our copending application 104,016, filed April 19, 1961, now U.S. Patent 3,221,015, i.e., by hydrogenation of 3,8-diazabicyclo-[3,2,1]-octane-2,4-diones with lithium aluminium hydride in a solvent. Alternatively, individual starting compounds may more advantageously be prepared by other procedures, as will be apparent from the following examples. In any case, such procedures are illustrated in our above named copending applications.

The following non-limitative examples illustrate the invention.

EXAMPLE 1

*3-methyl-8-acetyl-3,8-diazabicyclo-[3,2,1]-octane*

The starting compound 3-methyl-3,8-diazabicyclo-[3,2,1]-octane is prepared from 3-methyl-8-carbobenzoxy-3,8-diazabicyclo-[3,2,1]-octane-2,4-dione described in our copending application 104,016, by hydrogenolysis of the carbobenzoxy group and subsequent reduction of the obtained 3-methyl-3,8-diazabicyclo-[3,2,1]-octane-2,4-dione, as follows:

A mixture of 10 g. of 3-methyl-8-carbobenzoxy-3,8-diazabicyclo-[3,2,1]-octane-2,4-dione, 150 ml. of ethyl alcohol and 4 g. of palladium on charcoal is hydrogenated at atmospheric pressure for 1–2 hours. After filtration of the catalyst and evaporation of the solvent 5.6 g. of 3-methyl- 3,8-diazabicyclo-[3,2,1] - octane-2,4-dione melting at 102–4° C. are obtained.

To 7.5 g. of lithium aluminium hydride in 200 ml. of anhydrous tetrahydrofuran 10 g. of 3-methyl-3,8-diazabicyclo-[3,2,1]-octane-2,4-dione dissolved in 250 ml. of tetrahydrofuran are added. The mixture is refluxed for 5 hours and then stirred for 2 hours at room temperature. After filtration of the hydrates the tetrahydrofuran solution is dried over $Na_2SO_4$ and evaporated to dryness. The residual 9 g. are distilled in vacuo collecting the fraction passing at 84–87° C./30 mm. Hg. There are obtained 5.9 g. of 3-methyl-3,8-diazabicyclo-[3,2,1]-octane, melting at 239–243° C. The corresponding dihydrochloride melts at 300–310° C.

To 8.5 ml. of acetic anhydride 2.9 g. of 3-methyl-3,8-diazabicyclo-[3,2,1]-octane are added portionwise keeping the temperature at 20° C.

The mixture is heated at 60° C. for 1 hour, cooled to room temperature, poured into ice, made alkaline with 50% NaOH and extracted with ether. From the ether solution 4 g. of raw product are obtained and distilled in vacuo collecting the fraction passing at 90–95° C./0.9 mm. Hg. The product solidifies rapidly: yield 2.9 g.; M.P. 40–43° C.

EXAMPLE 2

*3-acetyl-8-methyl-3,8-diazabicyclo-[3,2,1]-octane*

The starting compound 8-methyl-3,8-diazabicyclo-[3,2,1]-octane is prepared by hydrogenolysis of 3-benzyl-8-methyl-3,8-diazabicyclo-[3,2,1]-octane. This latter is obtained as described in our copending application 104,016, as follows: A mixture of 23 g. of 3-benzyl-8-methyl-3,8-diazabicyclo-[3,2,1]-octane, 6 g. of 10% palladium on charcoal and 400 ml. of absolute ethanol is hydrogenated in an autoclave at 40° C. and 30 atmospheres for 6 hours. Then it is cooled and after filtration of the catalyst the solvent is removed and the residue is distilled in vacuo collecting the fraction at 115–120° C./40 mm. Hg; yield 12.1 g. of 8-methyl-3,8-diazabicyclo-[3,2,1]-octane boiling at 193–195° C. To 7 ml. of acetic anhydride 2.5 g. of 8-methyl-3,8-diazabicyclo-[3,2,1]-octane are added portionwise keeping the temperature at 20° C. The mixture is heated for 1 hour at 50–60° C., cooled and poured into ice. It is then made alkaline with 50% NaOH and the separated oil is extracted with ether. From the ether solution, by evaporation of the solvent 3.5 g. of raw product are obtained; 2.6 g. of pure product are obtained by distillation at 107–110° C./0.5 mm. Hg. By reacting 2.5 g. of 3-acetyl-8-methyl-3,8-diazabicyclo-[3,2,1]-octane so obtained with 3.2 g. (1.5 moles) of methyl iodide in 150 ml. of ether, 3.2 g. of methiodide are obtained; M.P. 208–211° C.

EXAMPLE 3

*3-methyl-8-propionyl-3,8-diazabicyclo-[3,2,1]-octane*

To 2.5 g. of 3-methyl-3,8-diazabicyclo-[3,2,1]-octane 7 ml. of propionic acid anhydride are added dropwise with cooling, keeping the temperature below 30° C. The reaction mixture is then heated for 1 hour at 100° C., cooled, poured into ice, allowed to stand for 10 minutes and made alkaline with 50% NaOH by cooling. An oil separates which is then extracted with ether. The ether solution, dried over $Na_2SO_4$ and evaporated to dryness gives 3.3 g. of raw product, which is purified by distillation, collecting the fraction passing over at 93–98° C./0.4 mm. Hg.

EXAMPLE 4

*3-propionyl-8-methyl-3,8-diazabicyclo-[3,2,1]-octane*

This compound is prepared from 2.5 g. of 8-methyl-3,8-diazabicyclo-[3,2,1]-octane and 7 ml. of propionic acid anhydride as described for the isomer 3-methyl-8-propionyl - 3,8 - diazabicyclo - [3,2,1] - octane. Yield 3.4 g.; B.P. 112–120° C./0.8 mm. Hg.

EXAMPLE 5

*3-methyl-8-butyryl-3,8-diazabicyclo-[3,2,1]-octane*

To 5 g. of 3-methyl-3,8-diazabicyclo-[3,2,1]-octane 9.1 g. of butyric acid anhydride are added dropwise under stirring, keeping the temperature below 20° C. The mixture is heated at 100° C., for 2 hours, cooled, poured into ice, acidified to Congo red with concentrated HCl and extracted twice with ether. The aqueous phase is made alkaline with 50% NaOH and extracted with ether. The ether solution, dried over $Na_2SO_4$ and evaporated to dryness gives an oil which is rectified in vacuo giving 5.2 g. of 3-methyl-8-butyryl-3,8-diazabicyclo-[3,2,1]-octane. The corresponding hydrochloride has M.P. 120° C.

EXAMPLE 6

*3-methyl-8-cinnamoyl-3,8-diazabicyclo-[3,2,1]-octane*

To 180 ml. of 2 N NaOH 20 g. of 3-methyl-3,8-diazabicyclo-[3,2,1]-octane are added followed by 40 g. of cinnamoyl chloride in 50 ml. of ethyl ether, added dropwise under cooling. The mixture is kept stirred at room temperature for 2 hours and extracted with ethyl ether. The ether solution, dried over $Na_2SO_4$ and evaporated to dryness gives 3-methyl-8-cinnamoyl-3,8-diazabicyclo-[3,2,1]-octane melting at 92–94° C.

EXAMPLE 7

*3-methyl-8-phenylacetyl-3,8-diazabicyclo-[3,2,1]-octane*

To 25.5 ml. of 2 N NaOH 3 g. of 3-methyl-3,8-diazabicyclo-[3,2,1]-octane are added, followed by 5.55 g. of phenyl-acetic acid chloride in 5 ml. of anhydrous ethyl ether, added dropwise under cooling and stirring. The mixture is allowed to stand 3 hours at room temperature, extracted with ether and dried over $Na_2SO_4$. By evaporation of the solvent 5.6 g. of oil are obtained, which crystallise on standing. It is recrystallized from ligroin and 4.4 g. of the product melting at 65–68° C. are obtained.

EXAMPLE 8

*3-benzoyl-8-methyl-3,8-diazabicyclo-[3,2,1]-octane*

To 18 ml. of 2 N NaOH, 2 g. of 8-methyl-3,8-diazabicyclo-[3,2,1]-octane are added. The mixture is cooled and 4.7 g. of benzoyl chloride are added dropwise with cooling and stirring, keeping the temperature at −5/−10° C.

The reaction mixture is made alkaline with NaOH, water is added to dissolve the precipitate and then it is extracted with ethyl ether. The ether solution is dried over $Na_2SO_4$ and evaporated. There are obtained 3.5 g. of raw product which is purified by distillation collecting the fraction passing over at 158–165° C./1 mm. Hg. The citrate of 3-benzoyl-8-methyl-3,8-diazabicyclo-[3,2,1]-octane melts at 151–153° C.

EXAMPLE 9

*3-methyl-8-benzoyl-3,8-diazabicyclo-[3,2,1]-octane*

This compound is prepared substantially as described for the isomer starting from 3-methyl-3,8-diazabicyclo-[3,2,1]-octane. It is purified by distillation collecting the fraction passing over at 128–135° C./0.4 mm. Hg, yield 92%. The corresponding citrate melts at 182–184° C.

EXAMPLE 10

*3-benzyl-8-propionyl-3,8-diazabicyclo-[3,2,1]-octane*

To 10 g. of 3-benzyl-3,8-diazabicyclo-[3,2,1]-octane prepared as described in our copending application 104,016, 15 ml. of propionic acid anhydride are added with cooling and stirring, keeping the temperature at 30° C. Then it is heated at 100° C. for 2–3 hours, cooled, poured into ice, acidified to Congo red and extracted with ethyl ether, removing the ether phase. The aqueous phase is made alkaline and extracted with ethyl ether and the ether phase is then dried over $Na_2SO_4$ and the solvent is evaporated. The oily residue is rectified in vacuo, collecting the fraction passing over at 150–155° C./0.3 mm. Hg; yield 7 g.

EXAMPLE 11

*8-propionyl-3,8-diazabicyclo-[3,2,1]-octane*

It is prepared according to the preceding example starting from 3,8-diazabicyclo-[3,2,1]-octane, described in our copending applications S.N. 86,854 and 104,016. Yield 82%, B.P. 110° C./0.4 mm. Hg.

EXAMPLES 12–23

The following compounds were prepared substantially as described in the preceding examples:

| 3-Substituent | 8-Substituent | M.W. | M.P., ° C. | B.P. |
|---|---|---|---|---|
| Benzyl | Butyryl | 272.378 | | 170–5° C./0.6 mm. |
| Butyl | Propionyl | 224.338 | | 105° C./0.2 mm. |
| Isopropyl | do | 210.312 | | 100° C./0.2 mm. |
| Ethyl | do | 196.286 | | 85–90° C./0.4 mm |
| Cinnamyl | do | 284.388 | | 170° C./0.2 mm. |
| Do | Methyl | 256.338 | 121 | |
| α-methyltropoyl | do | 306.394 | 97–100 | |
| (+)-α-methyltropoyl(monohydrate) | do | 306.394 | 76–78 | |
| (−)-α-methyltropoyl(hydrochloride) | do | 324.843 | 175–180 | |
| Tropoyl | do | 316.817 | 195–200 | |
| Phenyl | Propionyl | 244.326 | 86–88 | |
| Methyl | Methyltropoyl (hemihydrate) | 297.386 | 98–100 | |

We claim:
1. 3 - (α - methyltropoyl) - 8 - methyl-3,8-diazabicyclo-[3,2,1]-octane.

2. (+) - 3 - (α - methyltropoyl) - 8 - methyl-3,8-diazabicyclo-[3,2,1]-octane.

3. (−) - 3 - (α - methyltropoyl) - 8 - methyl - 3,8 - diazabicyclo-[3,2,1]-octane.

4. 3-methyl-8-propionyl-3,8-diazabicyclo-[3,2,1]-octane.

5. 3-cinnamyl-8-propionyl-3,8-diazabicyclo-[3,2,1]-octane.

References Cited by the Examiner

Blackman: "The Synthesis of 3,8-Diazabicyclo-(3.2.1) Octane and Some of the Nitrogen Substituted Derivatives," a doctoral thesis submitted to the library of Polytechnic Institute of Brooklyn, in June 1960.

Blackman et al.: Journal Organic Chemistry, vol. 26, pp. 2750–2755 (1961), from a thesis submitted by S. W. Blackman to the School of Graduate Study of the Polytechnic Institute of Brooklyn in partial fulfillment of the requirement for the degree of Doctor of Philosophy, June 1960.

ALEX MAZEL, *Primary Examiner.*

IRVING MARCUS, WALTER A. MODANCE, NICHOLAS S. RIZZO, *Examiners.*

N. H. STEPNO, J. W. ADAMS, *Assistant Examiners.*